US012377582B2

(12) United States Patent
Bonnet et al.

(10) Patent No.: US 12,377,582 B2
(45) Date of Patent: Aug. 5, 2025

(54) METHOD FOR RECYCLING FILTERING FACEPIECE RESPIRATORS

(71) Applicant: Arkema France, Colombes (FR)

(72) Inventors: Anthony Bonnet, Colombes (FR); Salima Boutti, Serquigny (FR)

(73) Assignee: Arkema France, Puteaux (FR)

( * ) Notice: Subject to any disclaimer, the term of this patent is extended or adjusted under 35 U.S.C. 154(b) by 290 days.

(21) Appl. No.: 18/008,703

(22) PCT Filed: Jun. 18, 2021

(86) PCT No.: PCT/FR2021/051111
§ 371 (c)(1),
(2) Date: Dec. 7, 2022

(87) PCT Pub. No.: WO2021/255402
PCT Pub. Date: Dec. 23, 2021

(65) Prior Publication Data

US 2023/0219262 A1 Jul. 13, 2023

(30) Foreign Application Priority Data

Jun. 19, 2020 (FR) ..................................... 20.06431

(51) Int. Cl.

| | |
|---|---|
| ***B29B 17/04*** | (2006.01) |
| ***B29K 27/00*** | (2006.01) |
| ***B29K 105/12*** | (2006.01) |
| ***B29L 31/00*** | (2006.01) |
| ***B29L 31/48*** | (2006.01) |

(52) U.S. Cl.
CPC .. *B29B 17/0412* (2013.01); *B29B 2017/0484* (2013.01); *B29K 2027/16* (2013.01); *B29K 2105/124* (2013.01); *B29L 2031/4835* (2013.01); *B29L 2031/753* (2013.01)

(58) Field of Classification Search
CPC .......... B29K 2027/16; B29K 2105/124; B29L 2031/4835; B29L 2031/753; A41D 13/11; B62B 23/25; B41M 2205/14; A61B 16/06; A61F 11/00; A62B 18/00; B63C 11/00; B29B 17/0412; B29B 2017/0484
See application file for complete search history.

(56) References Cited

U.S. PATENT DOCUMENTS

2015/0250910 A1* 9/2015 Singh ...................... A61L 2/022
264/465
2019/0314746 A1* 10/2019 Leung .................. D01D 5/0076
2023/0220180 A1* 7/2023 DeBruin ............. B29B 17/0026
521/48.5

FOREIGN PATENT DOCUMENTS

| | | | | | |
|---|---|---|---|---|---|
| EP | 1616907 | A1 * | 1/2006 | | C08F 14/22 |
| EP | 2517607 | A1 | 10/2012 | | |
| WO | WO12089964 | A1 | 7/2012 | | |
| WO | WO-2012089964 | A1 * | 7/2012 | | A41D 13/1146 |
| WO | WO-2021000974 | A1 * | 1/2021 | | B01D 39/1623 |

OTHER PUBLICATIONS

English translation of WO-2012089964-A1 by EPO. (Year: 2012).*
English translation of EP-1616907-A1 by EPO. (Year: 2006).*

* cited by examiner

*Primary Examiner* — Xiao S Zhao
*Assistant Examiner* — Inja Song
(74) *Attorney, Agent, or Firm* — Joanne Rossi

(57) ABSTRACT

The invention relates to a method for recycling respiratory protection masks comprising a plurality of layers manufactured from a single thermoplastic polymer chosen from polypropylene, polyethylene terephthalate, polylactic acid, homopolymers and copolymers of polyamide 6 (PA6) and long-chain polyamides such as PA11 or PA12, and comprising a filtration layer made of polyvinylidene fluoride.

11 Claims, No Drawings

METHOD FOR RECYCLING FILTERING FACEPIECE RESPIRATORS

This application is a national stage application under 35 U.S.C. § 371 of PCT Application PCT/FR2021/051111, filed Jun. 18, 2021; which claims benefit to French National Patent Application Number FR 2006431, filed Jun. 19, 2020; said applications incorporated herein by reference.

FIELD OF THE INVENTION

The present invention relates to a method for recycling respiratory protection masks comprising a plurality of layers manufactured from a single thermoplastic polymer chosen from polypropylene, polyethylene terephthalate, polylactic acid, homopolymers and copolymers of polyamide 6 (PA6) and long-chain polyamides such as PA11 or PA12, and comprising a filtration layer made of polyvinylidene fluoride.

TECHNICAL BACKGROUND

Particle masks are respiratory protection devices capable of filtering particles and fine dust. These masks include personal protective equipment such as FFP masks (for "Filtering Facepiece Particles"). Their scope of protection is determined by European standard EN 149 which specifies the minimum characteristics to be required of filtering half masks used as respiratory protection devices against particles, excluding those for escape purposes. This standard defines three classes of devices, namely FFP1, FFP2 and FFP3, on the basis of three criteria: the maximum penetration of the filtering material by aerosols of mass-average diameter of 0.6 μm, the respiratory resistance and the inward leakage rate.

The FFP1 dust mask has an aerosol filtration rate of at least 80% and an inward leakage rate of no more than 22%.

The FFP2 mask has an aerosol filtration rate of at least 94% and an inward leakage rate of no more than 8%. This mask protects against pulverulent chemical substances and may also serve to protect against aerosols carrying viral particles and/or bacteria.

The FFP3 mask has an aerosol filtration rate of no less than 99% and an inward leakage percentage of no more than 2%. It protects against very fine particles of asbestos (asbestosis) or of silica (silicosis).

There are also masks for medical use (surgical masks) developed in accordance with the standard EN 14683, intended to avoid the projection towards the surroundings of droplets emitted by the person wearing the mask. These masks also protect the wearer against the projection of droplets emitted by a person facing them. On the other hand, depending on the circumstances, they do not protect against the inhalation of very small particles suspended in the air and potentially carrying viruses.

Respiratory protection masks are generally composed of fibers, or combinations of synthetic fibers, obtained from thermoplastic polymers such as: polyolefins, polyamides, polyvinyls, polyimides, polyacrylates, polymethacrylates, polyurethanes or else fluoropolymers, and in particular polyvinylidene fluoride (PVDF).

Among the many types of masks known, some comprise at least one layer of nanofibers which are particularly suitable for ensuring the barrier properties required for respiratory protection of at least FFP2 type. The solution electrospinning of polymers makes it possible to obtain, under certain conditions, fibers having sufficiently small diameters for good breathability and good mechanical, and possibly electrostatic, filtration efficiency of the membrane for air filtration.

Document EP 2517607 describes the advantages of masks comprising at least one layer of nanofibers, and the manufacture thereof by electrospinning. The masks have structures of the sandwich type since they comprise several superposed layers, for example a triple layer of the type: nonwoven layer—nanofibrous layer—nonwoven layer.

Document US2019/0314746 describes the obtaining of a nonwoven porous PVDF membrane by an electrospinning process, suitable for air filtration. The nanofibers are electrospun onto the surface of a drum covered with a nonwoven polypropylene substrate.

The growing use of respiratory masks, whether they be single-use (disposable) or reusable, is leading to a major environmental problem in terms of managing this waste and reusing the polymer material used for the manufacture of these masks. Used masks are potentially laden with particles and/or contaminated with pathogenic microorganisms (bacteria and/or viruses). There are several methods for cleaning reusable masks: washing with a detergent at 60 or 95° C., sterilization at 121° C. for 50 minutes, irradiation with gamma or beta radiation, exposure to ethylene oxide, heating at 70° C. in a dry heat or in water, the use of hydrogen peroxide vapors.

However, even when the cleaning is effective and makes it possible to remove the dust particles and/or the microorganisms deposited on the mask, the mask can only undergo a limited number of cleaning cycles, after which there are the problems of the treatment of the used masks and of the desired recovery of all or some of the raw materials that were used to manufacture them.

There is therefore a need to develop a method for recycling used masks that makes it possible to prevent their accumulation and possible pollution of the environment and to recover the raw materials that were used to manufacture them.

It has now been found that used masks containing layers manufactured from a given predominant thermoplastic polymer, chosen from polypropylene, polyethylene terephthalate, polylactic acid and certain polyamides, and PVDF in the form of nanofibers, can supply a recycling method leading to the obtaining of a masterbatch capable of being used as a polymer processing aid (PPA), that is to say an additive which makes it possible, among other things:

- to reduce or eliminate the surface defects appearing when said thermoplastic resin is extruded,
- to reduce the pressure at the head of the extrusion die, thus making it possible to increase the flow rate of the extrusion line,
- to limit the frequency of cleaning of the extrusion die,
- to limit the formation of surface defects on the extruded film.

SUMMARY OF THE INVENTION

An aim of the invention is to provide a method for recycling respiratory protection masks containing from 98.5% to 99.5% by weight of a predominant thermoplastic polymer chosen from polypropylene, polyethylene terephthalate, polylactic acid, homopolymers and copolymers of polyamide 6 (PA6) and long-chain polyamides such as PA11 or PA12, and from 0.05% to 1.5% of poly(vinylidene fluoride) or PVDF in the form of nanofibers, said method comprising the following steps:

a) grinding the masks leading to the obtaining of flakes, b) granulating (extruding) said flakes leading to the obtaining of a masterbatch in the form of granules.

Advantageously, said masterbatch obtained by the recycling method according to the invention can be used as a polymer processing aid in the melt processing of the predominant thermoplastic for the manufacture of all types of articles, in particular in the form of film, fiber, cable or molded part.

According to one embodiment, the masks subjected to the recycling method according to the invention comprise a layer of PVDF nanofibers obtained by an electrospinning process, said layer being deposited on a predominant thermoplastic polymer substrate.

The present invention relates to a method for regenerating used respiratory protection masks, allowing the recovery of the polymer raw materials used in their composition. More particularly, the method according to the invention applies to masks comprising a plurality of layers manufactured from a predominant thermoplastic polymer chosen from polypropylene, polyethylene terephthalate, polylactic acid, homopolymers and copolymers of polyamide 6 (PA6) and long-chain polyamides such as PA11 or PA12, and comprising a filtration layer made of polyvinylidene fluoride, and leads to the production of a masterbatch that is usable directly as polymer processing aid for the extrusion of said predominant thermoplastic polymer.

The use of this masterbatch in a line for processing the predominant thermoplastic polymer leads to an increase ranging up to 10% in the productivity of the line, and a reduction in the extrusion pressure of 10% to 20%, compared to the extrusion of the same thermoplastic polymer in the absence of a polymer processing aid. Furthermore, there has been observed an increased persistence of the electrets on the surface of said thermoplastic polymer, obtained using the polymer processing aid produced according to the method of the invention, compared with the same, but unmodified, polymer.

DESCRIPTION OF EMBODIMENTS OF THE INVENTION

The invention is now described in more detail and in a non-limiting way in the description which follows.

The invention is based on the discovery of the ability of respiratory protection masks, in particular masks of the FFP1 to FFP3 type and surgical masks, comprising a predominant thermoplastic polymer chosen from polypropylene, polyethylene terephthalate, polylactic acid, homopolymers and copolymers of polyamide 6 (PA6) and of long-chain polyamides such as PA11 or PA12, and a filtration layer made of polyvinylidene fluoride nanofibers, to be subjected to a recycling method to provide a masterbatch capable of performing, in the molten state, the role of polymer processing aid during the processing of said predominant thermoplastic polymer, leading to a reduction in the pressure at the head in the extruder, allowing an increase in the flow rate during the extrusion and reducing the material deposited at the head of the die, which can create defects on the fibers, the rods or the films extruded. This makes it possible to reduce the frequency of cleaning the equipment and therefore of machine stoppages.

According to a first aspect, the invention provides a method for recycling respiratory protection masks containing from 98.5% to 99.5% by weight of a predominant thermoplastic polymer chosen from polypropylene, polyethylene terephthalate, polylactic acid, homopolymers and copolymers of polyamide 6 (PA6) and of long-chain polyamides such as PA11 or PA12, and from 0.05% to 1.5% of poly(vinylidene fluoride) or PVDF, in particular in the form of nanofibers, said method comprising a step of grinding the masks leading to the obtaining of flakes, and a step of granulating (extruding) said flakes, leading to the obtaining of a masterbatch in the form of granules.

According to various embodiments, said method comprises the following features, combined where appropriate.

The masks employed in this recycling method are used masks containing exclusively a single thermoplastic polymer, referred to as "predominant", chosen from polypropylene, polyethylene terephthalate, polylactic acid, homopolymers and copolymers of polyamide 6 (PA6) and long-chain polyamides such as PA11 or PA12, and PVDF. More particularly, these masks contain from 98.5% to 99.5% by weight of predominant thermoplastic polymer and from 0.05% to 1.5% of poly(vinylidene fluoride) or PVDF, in particular in the form of nanofibers.

According to one embodiment, the recycling method uses surgical masks complying with the standard EN 14683.

According to one embodiment, the recycling method uses FFP-type masks complying with the standard EN 149.

According to one embodiment, the recycling method employs a mixture of surgical masks and FFP-type masks, provided that they have the composition indicated above.

The term "used mask" employed here includes masks that have served their purpose (worn out), and also unused masks that have expired because they have exceeded the warranty period provided by the manufacturer, and even waste material (particularly of thermoplastic polymer) recovered during the manufacture of the masks, which can represent 15% to 16% of the total material used.

According to one embodiment, the mask employed in the recycling method is a respiratory mask consisting of a body and of retaining straps, said body being composed of at least two and preferably three layers, including a layer of PVDF filtering material, said body comprising a nose bridge, said retaining straps being fixed to the body of the mask without addition of material, preferably by welding. In this mask, all of the layers, with the exception of the PVDF fibers, of materials constituting the body and the retaining straps are composed of nonwovens of the same predominant thermoplastic polymer material. The predominant thermoplastic polymer is chosen from polypropylene, polyethylene terephthalate, polylactic acid, homopolymers and copolymers of polyamide 6 (PA6) and of long-chain polyamides such as PA11 or PA12.

The long-chain polyamides are aliphatic polyamides having an average number of carbon atoms per each nitrogen atom of greater than 8.5, preferably of greater than 9, in particular of greater than 10.

The PVDF employed within the context of the invention is also a thermoplastic polymer. The fluoropolymer used in the invention and generically denoted by the abbreviation PVDF is a polymer based on vinylidene difluoride.

The term "thermoplastic" means here a nonelastomeric polymer. An elastomeric polymer is defined as being a polymer which can be drawn, at ambient temperature, to twice its initial length and which, after releasing the stresses, rapidly resumes its initial length, to within about 10%, as indicated by the ASTM in the Special Technical Publication, No. 184.

According to one embodiment, the mask to be recycled contains an inner layer of nonwoven thermoplastic polymer with a grammage of between 20 and 100 g/m$^2$ and having a permeability of between 500 and 1500 l/m$^2$/s measured at 100 Pa. Said thermoplastic polymer has a melt flow rate (MFR) of 34 g/10 min at 230° C. under 2.16 kg.

According to one embodiment, the mask to be recycled comprises a central layer comprising a nonwoven substrate with a grammage of between 20 and 100 g/m$^2$ and having a permeability of between 500 and 2500 l/m$^2$/s measured at 100 Pa.

According to one embodiment, said substrate is manufactured by spun-bonding from a thermoplastic polymer that has a melt flow rate of 34 g/10 min at 230° C. and 2.16 kg.

The support layer (the substrate) can, according to another embodiment, be manufactured by blow molding from a thermoplastic polymer that has a melt flow rate of 34 g/10 min at 230° C. and 2.16 kg.

According to one embodiment, deposited on this substrate, via an electrospinning process, is a layer of PVDF nanofibers. According to one embodiment, the PVDF comprises, and preferably consists of:

i. a PVDF homopolymer;

ii. a mixture of two PVDF homopolymers having different viscosities, or different molar masses, or different architectures, for example different degrees of branching;

iii. a copolymer comprising vinylidene difluoride (VDF) units and one or more types of units of comonomers compatible with vinylidene difluoride (referred to hereinafter as "VDF copolymer");

iv. a mixture of a PVDF homopolymer and of a VDF copolymer;

v. a mixture of two VDF copolymers.

The comonomers compatible with vinylidene difluoride can be halogenated (fluorinated, chlorinated or brominated) or non-halogenated. The term "compatible comonomer" is understood here to mean the ability of said comonomer to copolymerize with VDF and thus form a copolymer.

Examples of appropriate fluoro comonomers are: vinyl fluoride, tetrafluoroethylene, hexafluoropropylene, trifluoropropenes and in particular 3,3,3-trifluoropropene, tetrafluoropropenes and in particular 2,3,3,3-tetrafluoropropene or 1,3,3,3-tetrafluoropropene, hexafluoroisobutylene, perfluorobutylethylene, pentafluoropropenes and in particular 1,1,3,3,3-pentafluoropropene or 1,2,3,3,3-pentafluoropropene, perfluoroalkyl vinyl ethers and in particular those of the general formula Rf-O—CF—CF2, Rf being an alkyl group, preferably a $C_1$ to $C_4$ alkyl group (preferred examples being perfluoropropyl vinyl ether and perfluoromethyl vinyl ether). The fluoromonomer can comprise a chlorine or bromine atom. It can in particular be chosen from bromotrifluoroethylene, chlorofluoroethylene, chlorotrifluoroethylene and chlorotrifluoropropene. Chlorofluoroethylene can denote either 1-chloro-1-fluoroethylene or 1-chloro-2-fluoroethylene. The 1-chloro-1-fluoroethylene isomer is preferred. Chlorotrifluoropropene is preferably 1-chloro-3,3,3-trifluoropropene or 2-chloro-3,3,3-trifluoropropene.

The VDF copolymer can also comprise non-halogenated monomers, such as ethylene, and/or acrylic or methacrylic comonomers.

When the layer of nanofibers is composed of a mixture of two constituents from among those mentioned above (ii., iv. and v.), the proportion by mass between the constituents ranges from 1:99 to 99:1.

According to one embodiment, said PVDF nanofibers have a mean fiber diameter Dv50 of between 30 and 500 nm, preferably from 30 to 300 nm. The Dv50 is the volume-median diameter, which corresponds to the value of the particle size which divides the population of particles examined exactly into two. The Dv50 is measured according to the standard ISO 9276—parts 1 to 6.

According to one embodiment, said electrospun PVDF layer has a grammage of between 0.03 g/m$^2$ and 3 g/m$^2$.

The mean thickness of this layer of PVDF nanofibers is from 0.1 μm to 100 μm. The diameter of the fibers, their thickness and their distribution can be estimated by scanning electron microscopy (SEM).

The solvent used in the electrospinning to dissolve the PVDF is chosen from cyclopentanone, N,N-dimethylacetamide, N,N-dimethylformamide, dimethyl sulfoxide, acetone, ethyl methyl ketone, tetrahydrofuran, γ-butyrolactone, hexafluoroisopropanol, or mixtures thereof in all proportions.

The layer of PVDF deposited by electrospinning may be electrically charged by a corona treatment in order to improve its filtration properties and to obtain an aerosol filtration rate of at least 80%, preferably of greater than 94%, or even of greater than 98%, and a pressure drop of much less than 70 Pa·s for an air inspiration flow rate of 95 l/min.

According to one embodiment, the used masks to be recycled comprise an outer layer of thermoplastic polymer having a melt flow rate (MFR) of 34 g/10 min at 230° C. under 2.16 kg; this nonwoven layer has a grammage of between 20 and 100 g/m$^2$ and a permeability of between 500 and 1500 l/m$^2$/s measured at 100 Pa.

According to one embodiment, the retaining straps of the mask to be recycled, made of thermoplastic polymer, are adjustable loops produced by injection molding or 3D printing or elastic bands (nonwoven or wrapped filaments), manufactured from said thermoplastic polymer with a grammage of between 10 and 100 g/m$^2$ and having a melt flow rate of 34 g/10 min at 230° C. and 2.16 kg.

According to one embodiment, the nose bridge is manufactured from a mixture of 50% by weight of a PVDF homopolymer having a melt flow rate of 32 g/10 min at 230° C. under 2.16 kg, and 50% by mass of a predominant thermoplastic polymer chosen from polypropylene, polyethylene terephthalate, polylactic acid, homopolymers and copolymers of polyamide 6 (PA6) and of long-chain polyamides such as PA11 or PA12, and having a melt flow rate of 34 g/10 min at 230° C. under 2.16 kg.

The recycling method according to the invention comprises a first step of grinding the masks leading to the obtaining of flakes.

According to one embodiment, the used masks are passed through a knife mill to process them into fibers of a few millimeters, for example 1 to 10 mm, preferably 1 to 5 mm A screen makes it possible to calibrate the fiber pulp according to the desired length.

The grinding is carried out at a temperature which is at least 30° C. below the melting temperature Tm of the material to be processed, in the case of semicrystalline thermoplastic polymers, and at least 30° C. below the glass transition temperature Tg for the case of amorphous thermoplastic polymers.

According to one embodiment, the mask is ground in an extruder, which may be of the single-screw or twin-screw type, or in a BUSS co-kneader.

If the ground masks comprise metal parts, such as the nose bridge, these can be removed with a magnet.

The recycling method according to the invention then comprises a step of granulating said flakes, leading to the obtaining of a masterbatch in the form of granules.

According to one embodiment, the granulation is carried out in the molten state by extrusion through a die with circular holes, followed by chopping of the cooled strands and drying in order to produce granules of 1 to 5 millimeters in diameter.

According to another embodiment, the melt granulation takes place in a BUSS-type co-kneader with underwater chopping and production of lenticular granules.

According to a second aspect, the invention relates to the use of said masterbatch as a polymer processing aid in the extrusion of the same predominant thermoplastic polymer as that constituting the recycled mask, aside from the PVDF.

The polymer processing aid obtained by the recycling method according to the invention is used to reduce or eliminate the surface defects appearing during the extrusion of the predominant thermoplastic resin. It significantly reduces the time for obtaining a stable and defect-free extrusion within a range of extrusion parameters that normally exhibit significant extrusion instabilities.

The polymer processing aid and the thermoplastic resin are brought into contact in the solid state before extrusion. They can be premixed in the solid state or simply introduced into the extruder hopper. The polymer processing aid can also be introduced in the molten state at any point of the extruder used to extrude the thermoplastic resin, for example using a side extruder.

According to one embodiment, the proportion by weight of the polymer processing aid is from 1% to 30%, preferably from 1% to 10%, preferentially from 1.5% to 10%, more preferentially still from 2% to 10%, for respectively from 70% to 99%, preferably from 90% to 99%, preferentially from 90% to 98.5%, more preferentially still from 90% to 98%, of thermoplastic resin to be extruded.

The masterbatch is particularly useful for the extrusion of thermoplastic polymers in the form of a film or else in the form of a tube, of a profile or of a hollow body. In addition to the advantages already mentioned, it facilitates the obtaining of a smooth and defect-free surface, which is particularly important in the case of a film for obtaining good optical properties. The polymer processing aid also makes it possible to reduce the pressure at the die gap as well as the level of gels. It also makes it possible, to a certain extent, to reduce the deposits at the die outlet.

EXAMPLES

The following examples illustrate the invention without limiting it.

Example 1: Production of Electrospun Fibers on 18 g/m² Spunbonded Polypropylene (Spunbond PP)

A mixture of VF2 homopolymer (Kynar®761A) and copolymer (Kynar®2801-00) is dissolved with stirring for 2 hours at 55° C. and according to the composition indicated in table 1.

TABLE 1

| Electrospinning solution composition | |
|---|---|
| DMAC (wt %) | 62.6 |
| Acetone (wt %) | 25 |
| K761A (wt %) | 8.05 |
| K2801 (wt %) | 3.45 |
| Pluronic F127 (wt %) | 0.4 |
| Triton X-100 (wt %) | 0.5 |

This solution is then supplied to an electrospinning process on a 18 g/m² PP spunbond support. Such nonwovens are sold for example by Mogul. A filtration membrane based on electrospun fibers is thus produced with a width of 480 mm using the conditions indicated in table 2.

TABLE 2

| | Electrospinning PP 1 |
|---|---|
| Emitter-collector distance (mm) | 150 |
| Emitter voltage (kV) | +42 |
| Collector voltage (kV) | −45 |
| Airflow in the chamber ($m^3$/h) | 600 |
| Chamber air temperature (° C.) | 25 |
| Chamber air relative humidity (%) | 25 |
| Rotational speed of electrospinning heads (rpm) | 18500 |
| Polymer solution flow rate (ml/min) | 15 |
| Conveyor speed m/min | 5 |
| Oven temperature (° C.) | 45 |
| Material penetration according to EN149 + A1 (%) | 6 |
| Permeability l/$m^2$/s (100 Pa) | 97 |

Example 2: Production of Electrospun Fibers on 28 g/m² Spunbonded Polyester (Spunbond PET)

The electrospinning solution prepared as described in example 1 is supplied to an electrospinning process on a 28 g/m² PET spunbond support. Such nonwovens are sold for example by Mogul under the name Buffalo. A filtration membrane based on electrospun fibers is thus produced with a width of 480 mm using the conditions indicated in table 3.

TABLE 3

| | Electrospinning PET 1 |
|---|---|
| Emitter-collector distance (mm) | 150 |
| Emitter voltage (kV) | +42 |
| Collector voltage (kV) | −45 |
| Airflow in the chamber ($m^3$/h) | 600 |
| Chamber air temperature (° C.) | 25 |
| Chamber air relative humidity (%) | 25 |
| Rotational speed of electrospinning heads (rpm) | 18500 |
| Polymer solution flow rate (ml/min) | 15 |
| Conveyor speed m/min | 5 |
| Oven temperature (° C.) | 45 |
| Material penetration according to EN149 + A1 (%) | 5 |
| Permeability l/$m^2$/s (100 Pa) | 101 |

Example 3: Nose Bridge Production

The nasal support bridge is formed of a rod 1.5 mm in diameter and 10 cm in length. This rod is obtained by mixing/extrusion, at 230° C. in a single-screw extruder, of a 50/50 by mass mixture of PVDF homopolymer having a melt flow rate of 32 g/10 min at 230° C. under 2.16 kg and of polypropylene with a melt flow rate of 35 g/10 min at 230° C. under 2.16 kg.

Example 4: Assembly of the Mask from the Elements Produced in Examples 1 to 3

A mask is produced using the elements obtained in the preceding examples with the following structure: spunbond PP 1—Espun PP membrane 1—spunbond PP 2. The “spunbond PP 1” nonwoven (40 g/m²) forms the outer layer and improves the mechanical strength of the mask body. The “Espun PP 1” intermediate layer provides for aerosol filtration. Lastly, the “spunbond 2” nonwoven (18 g/m²) placed inside the mask is intended to be in contact with the face of the user, and it protects the filtration layer from possible degradation. The elastic bands are round strands of polypropylene, such products being sold for example by Liasa.

The assembly follows the steps described below:

Cohesion between the layers of nonwovens is obtained by lamination.

The nose bridge produced in example 3 is inserted into a space created by folding the nonwoven material over a width of 5±2 mm close to the periphery of the mask. The bridge is retained by spot welds placed regularly along the length of the fold.

The elastic bands are fixed on each side of the mask so as to form a loop and are fixed without addition of material by ultrasonic welding.

Example 6: Grinding/Granulation and Extrusion of the Recycled Material

After decontamination by passing through an oven at 70° C. for one hour, the masks are ground in a knife mill. The flakes obtained are fed into a BUSS-type twin-screw extruder at 230° C. in order to produce granules.

The granules obtained are composed of about 0.9 wt % of PVDF and are used as a masterbatch to achieve a concentration of 500 ppm of PVDF in the PP, and then used in a process for manufacturing multi-filaments by extrusion spinning.

The pressure reached at the extruder head during the production of PP multi-filaments in the presence of 500 ppm of PVDF is of the order of 4.8 MPa, i.e. approximately 20% lower than that conventionally obtained during the processing of PP alone. Also, the impact of the presence of PVDF is visually observed by less fouling of the dies after several hours of extrusion.

The invention claimed is:

1. A method for recycling respiratory protection masks containing from 98.5% to 99.5% by weight of a predominant thermoplastic polymer chosen from polypropylene, polyethylene terephthalate, polylactic acid, homopolymers and copolymers of polyamide 6 (PA6) and aliphatic polyamides having an average number of carbons per each nitrogen atom of greater than 8.5, and from 0.05% to 1.5% of PVDF in the form of nanofibers, said method comprising a step of grinding the masks leading to the obtaining of flakes, and a step of granulating said flakes, leading to the obtaining of a masterbatch in the form of granules.

2. The recycling method as claimed in claim 1, wherein the mask employed consists of a body and of retaining straps, said body being composed of at least two layers, including a layer of said PVDF in the form of nanofibers, said retaining straps being fixed to the body of the mask without addition of material.

3. The recycling method as claimed in claim 2, wherein said retaining straps are adjustable loops produced by injection molding or 3D printing or elastic bands, manufactured from said predominant thermoplastic polymer.

4. The recycling method as claimed in claim 1, wherein said mask comprises a nonwoven inner layer having a grammage of between 20 and 100 g/m$^2$ and made of said predominant thermoplastic polymer having a melt flow rate of 34 g/10 min at 230° C. under 2.16 kg.

5. The recycling method as claimed in claim 1, wherein said mask comprises a central layer comprising a nonwoven substrate with a grammage of between 20 and 100 g/m$^2$ and having a permeability of between 500 and 2500 l/m$^2$/s measured at 100 Pa.

6. The recycling method as claimed in claim 5, wherein said substrate is manufactured by blow molding or spunbonding said predominant thermoplastic polymer that has a melt flow rate of 34 g/10 min at 230° C. and 2.16 kg.

7. The recycling method as claimed in claim 5, wherein said central layer comprises an electrospun layer of said PVDF in the form of nanofibers.

8. The recycling method as claimed in claim 7, wherein the mean thickness of said electrospun layer of PVDF in the form of nanofibers is from 0.1 μm to 100 μm.

9. The recycling method as claimed in claim 1, wherein said PVDF comprises at least one of a PVDF homopolymer; a mixture of two PVDF homopolymers; a copolymer comprising vinylidene difluoride (VDF) units and one or more types of units of comonomers compatible with vinylidene difluoride; a mixture of a PVDF homopolymer and of a VDF copolymer; or a mixture of two VDF copolymers.

10. The recycling method as claimed in claim 1, wherein said PVDF nanofibers have a mean fiber diameter D50 of between 30 and 500 nm.

11. The recycling method as claimed in claim 1, wherein said mask comprises a nonwoven outer layer having a grammage of between 20 and 100 g/m$^2$ and made of said predominant thermoplastic polymer having a melt flow rate of 34 g/10 min at 230° C. under 2.16 kg.

* * * * *